US008019453B2

(12) United States Patent
Tsai et al.

(10) Patent No.: US 8,019,453 B2
(45) Date of Patent: Sep. 13, 2011

(54) DECIMATOR AND DECIMATING METHOD FOR MULTI-CHANNEL AUDIO

(75) Inventors: Tien Ju Tsai, Tainan County (TW); Chao Wei Huang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1123 days.

(21) Appl. No.: 11/682,462

(22) Filed: Mar. 6, 2007

(65) Prior Publication Data

US 2007/0211903 A1 Sep. 13, 2007

(30) Foreign Application Priority Data

Mar. 8, 2006 (TW) ............................... 95107735 A
Sep. 6, 2006 (TW) ............................... 95132842 A

(51) Int. Cl.
*G06F 17/00* (2006.01)

(52) U.S. Cl. ........................................................ 700/94

(58) Field of Classification Search .................... 700/94; 704/500–504

See application file for complete search history.

(56) References Cited

U.S. PATENT DOCUMENTS 5,138,452 A 8/1992 Soloff
6,061,655 A * 5/2000 Xue et al. ...................... 704/500

FOREIGN PATENT DOCUMENTS

CN 2416692 Y 1/2001

OTHER PUBLICATIONS

Office Action dated Apr. 29, 2010 for 200610152467.3 which is a corresponding Chinese application that cites CN2416692Y and US5138452A.

* cited by examiner

*Primary Examiner* — Andrew C Flanders
(74) *Attorney, Agent, or Firm* — WPAT, P.C.; Anthony King

(57) ABSTRACT

A decimator is used to process a multi-channel audio signal, and includes a memory, a controller and a processing unit. The processing unit is used to decimate each input audio component of a multi-channel audio signal to generate corresponding multi-channel operational data. The controller is used to control read and write actions for each audio component of the multi-channel audio signal and the multi-channel operational data into or from the memory. The memory provides a digital signal process for decimation together with the processing unit. The input of the multi-channel audio and the output of the multi-channel operational data are performed through time division. Compared with conventional decimator circuits, the decimator circuit of the present invention reduces the cost and the power consumption of the hardware circuitry.

15 Claims, 8 Drawing Sheets

DECIMATOR AND DECIMATING METHOD FOR MULTI-CHANNEL AUDIO

BACKGROUND OF THE INVENTION

1. Field of the Invention

The present invention relates to a decimator and a decimating method for digital signal processing (DSP), and more particularly to a decimator and a decimating method for multi-channel audio processing.

2. Description of the Related Art

FIG. 1(*a*) is a spectrum distribution diagram of a television multi-track stereo (MTS) audio specified by the US broadcast television systems committee (BTSC). The television MTS audio 10 is a composite signal, which includes a single-track (L+R) signal 101, a pilot signal 102, a stereo difference (L−R) signal 103, a second audio program (SAP) signal 104 and a professional channel signal 105.

The single-track (L+R) signal 101 is a base band signal, with a frequency of about 15 KHz. The frequency Fh of the pilot signal 102 is 15.734 KHz, which equals a horizontal scanning frequency of the BTSC video. The stereo difference (L−R) signal 103 is an amplitude modulation signal of the double sideband suppressed carrier (DSB_SC), with a central frequency of 2*Fh. The central frequency of the second audio program (SAP) signal 104 is 5*Fh, with the frequency spectrum ranging from +10 KHz to −10 KHz. The central frequency of the professional channel signal 105 is 6.5*Fh, with the frequency spectrum ranging from +3 KHz to −3 KHz.

FIG. 1(*b*) is a schematic block diagram of the circuit of the BTSC television multi-track stereo audio 10 for decimation. A stereo difference signal 103*a* is obtained after the television multi-track stereo (MTS) audio 10 is mixed and decimated for 2Fh through a frequency mixer 120. Since the second audio program (SAP) signal 104 employs frequency modulation (FM), the pilot signal 102 may not be sent together when the transmitting side transmits the second audio program (SAP) signal 104. Accordingly, the receiving side cannot perform coherent demodulation. Therefore, after the television MTS audio 10 is mixed and decimated for 5Fh through the frequency mixer 120, a second audio program in-phase (SAP_I) signal 104*a* and a second audio program quadrature phase (SAP_Q) signal 104*b* are respectively obtained and sent to a frequency discriminator 140 for FM demodulation.

The mixed and decimated stereo difference signal 103*a*, the second audio program in-phase (SAP_I) signal 104*a* and the second audio program quadrature phase (SAP_Q) signal 104*b* are mainly base band signals, but still having certain high-frequency signals derived from the mixing and decimating process.

The sampling frequencies of the single-track signal 101, the stereo difference signal 103*a*, the second audio program in-phase (SAP_I) signal 104*a* and the second audio program quadrature phase (SAP_Q) signal 104*b* are decimated through four decimators 135, 132, 133 and 134 (referring to FIG. 1(*b*)) during the digital signal processing so as to obtain the single-track signal 101*b*, the stereo difference signal 103*ab*, the second audio program in-phase (SAP_I) signal 104*c* and the second audio program quadrature phase (SAP_Q) signal 104*d* after decimation.

During the digital signal processing of the decimators 131, 132, 133 and 134, in order to reduce the sampling frequency and avoid the aliasing of the frequency spectrum, a finite impulse response (FIR) filter is employed to act as a low-pass filter for the frequency domain and reduce the sampling frequency for the time domain. Additionally, the high-frequency signals derived from the mixing and decimating process can be filtered through the low-pass filtering process of the FIR filter.

FIG. 1(*c*) is a schematic block diagram of the circuit of a second order FIR filter 160, which can be implemented to the previous stage of the decimators 131, 132, 133 and 134. The input signal 161 is converted into a first delay input signal 162 after being delayed by a time delayer 165. The first delay input signal 162 is converted into a second delay input signal 163 after being delayed by a time delayer 166. The signals 161, 162 and 163 are respectively multiplied with the corresponding impulse response coefficients 161*h*, 162*h* and 163*h* by multipliers 161*m*, 162*m* and 163*m*, the products are added together by an adder 167, and thereby the summation is an output signal 168.

The actual FIR filter generally requires an extremely large order. If the conventional register is used to act as a time delayer, the manufacturing cost of the hardware circuits including the four decimators (shown in FIG. 1(*b*)) is extremely high. Meanwhile, since the registers are serially connected with each other, when the FIR filter is operated, the transition of the logic level of the register has high frequency, based on the generation of the circuit clocks, resulting in heavy power consumption.

FIG. 1(*d*) is a spectrum distribution diagram of a television multi-track stereo audio 11 regulated by the Electronic Industries Association of Japan (EIA-J). The audio 11 includes a single-track (L+R) signal 111, a stereo difference (L−R) signal 113 or a second audio program (SAP) signal 114, and a pilot identification signal 115. The transmitting side of the television stereo audio system for the EIA-J does not simultaneously transmit both the stereo difference (L−R) signal 113 and the second audio program (SAP) signal 114. The receiving side obtains signal data according to the amplitude modulation performance of the pilot identification signal 115, and the transmitted signal is the stereo difference (L−R) signal 113 or the second audio program (SAP) signal 114.

FIG. 1(*e*) is a schematic block diagram of the circuit of the audio 11 for decimation. After the audio 11 received by the receiving side is decimated for 2Fh by a frequency mixer 121, either the single-track (L+R) signal and the stereo difference (L−R) signal 113 or the single-track (L+R) signal and the second audio program quadrature phase (SAP) signal 114 are obtained.

After the single-track (L+R) signal 111 is decimated by a decimator 151, a single-track (L+R) signal 111*b* is obtained. The stereo difference (L−R) signal 113 includes a stereo difference in-phase (L−R_I) signal 113*a* and a stereo difference quadrature phase (L−R_Q) signal 113*b*. After the signals 113*a* and 113*b* are decimated by the decimators 153 and 154 respectively, a stereo difference in-phase (L−R_I) signal 113*c* and a stereo difference quadrature phase (L−R_Q) signal 113*d* are obtained. Alternatively, the second audio program (SAP) signal 114 includes a second audio program in-phase (SAP_I) signal 114*a* and a second audio program quadrature phase (SAP_Q) signal 114*b*. After the signals 114*a* and 114*b* are decimated by the decimators 153 and 154, a second audio program in-phase (SAP_I) signal 114*c* and a second audio program quadrature phase (SAP_Q) signal 114*d* are obtained. The FM demodulation of the stereo difference in-phase (L−R_I) signal 113*c* and the second audio program in-phase (SAP_I) signal 114*c* share the same path, and the FM demodulation of the stereo difference quadrature phase (L−R_Q) signal 113*d* and the second audio program quadrature phase (SAP_Q) signal 114*d* also share the same path.

Compared with the single-track (L+R) signal 111*b*, the stereo difference in-phase (L−R_I) signal 113*c* and the stereo difference quadrature phase (L−R_Q) signal 113*d* need to be demodulated through a frequency discriminator 141, and thus a period of latency is necessary for such demodulation. Therefore, the single-track (L+R) signal 111 shall be transmitted later than the stereo difference (L−R) signal 113 by 20 microseconds at the transmitting side in compliance with the regulation of EIA-J so as to separate a left single-track signal from a right single-track signal. However, the processing time required is sometimes more than 20 microseconds for demodulating the stereo difference in-phase (L−R_I) signal 113*c* and the stereo difference quadrature phase (L−R_Q) signal 113*d* through the frequency discriminator 141, and consequently the latency for separating the left single-track signal from the single-track signal is not consistent.

SUMMARY OF THE INVENTION

An objective of the present invention is to provide a decimator and a decimating method to perform the digital signal processing of multi-channel audio, which is capable of reducing the manufacturing costs of hardware circuits as well as their power consumption. Additionally, the present invention may also be applied to other multi-channel digital signals, and is not limited to audio signals.

To achieve the above objective, the present invention provides a decimator for multi-channel audio with random access memory (RAM) as a basic configuration. The decimator for multi-channel audio comprises a memory, a controller and a processing unit. The processing unit is coupled to the memory, and used to perform digital signal processing to decimate the input multi-channel digital signal. The memory is used to store two kinds of data from different inputting paths; one is an input multi-channel digital signal from the decimator, and the other is the multi-channel operational data from the processing unit, i.e., the multi-channel audio after decimation. The controller is coupled to the memory, and used to control the writing and reading of data into and from the memory such that the memory finishes the digital signal processing for decimation together with the processing unit.

The controller regulates the control timing according to the following steps. First, the input multi-channel audio data is written into the memory. The processing unit retrieves the multi-channel audio from the memory to perform digital signal processing for decimation, and then the multi-channel operational data after decimation is similarly written into the memory for storage. Finally, the decimated multi-channel operational data stored in the memory is read and outputted to a subsequent level circuit.

In the present invention, a single decimator with a memory as a basic configuration is used to replace the four decimators in the conventional circuit. Compared with the conventional decimator circuit, the decimator circuit of the present invention reduces the required chip area by about 35% when being verified by the actual process.

In addition, the time delayer of the decimator can be implemented by a memory cell of the memory without the problem of high-frequency transition of the logic level of the register as with the conventional architecture, and thereby the power consumption is significantly reduced.

The decimator of the present invention outputs at least one FM modulation audio component to a frequency discriminator for FM demodulation. The frequency discriminator comprises an FIR filter and an FM demodulator. The FM demodulation audio component is first low-pass filtered by the FIR filter, and then is FM demodulated by the FM demodulator. The time delayer of the FIR filter is also implemented by a memory cell of the memory.

If the single-track signal and the stereo difference signal of the television multi-track stereo audio system are received at different times with a predetermined timing difference, the stereo difference signal can be further FM demodulated. The decimating method of the present invention further comprises a steps of: performing a time delay of at least one sampling unit for the single-track signal, wherein the time delay equals the sum of the time required for FM demodulating the stereo difference signal and the time difference.

BRIEF DESCRIPTION OF THE DRAWINGS

The invention will be described according to the appended drawings in which:

FIG. 1(*b*) is a schematic block diagram of the BTSC television multi-track stereo audio for decimation;

FIG. 1(*c*) is a schematic circuit diagram of a second order FIR filter;

FIG. 1(*d*) is a spectrum distribution diagram of an EIA-J television multi-track stereo audio;

FIG. 1(*e*) is a schematic block diagram of the EIA-J television multi-track stereo audio for decimation;

DETAILED DESCRIPTION OF THE INVENTION

Figure 1A:
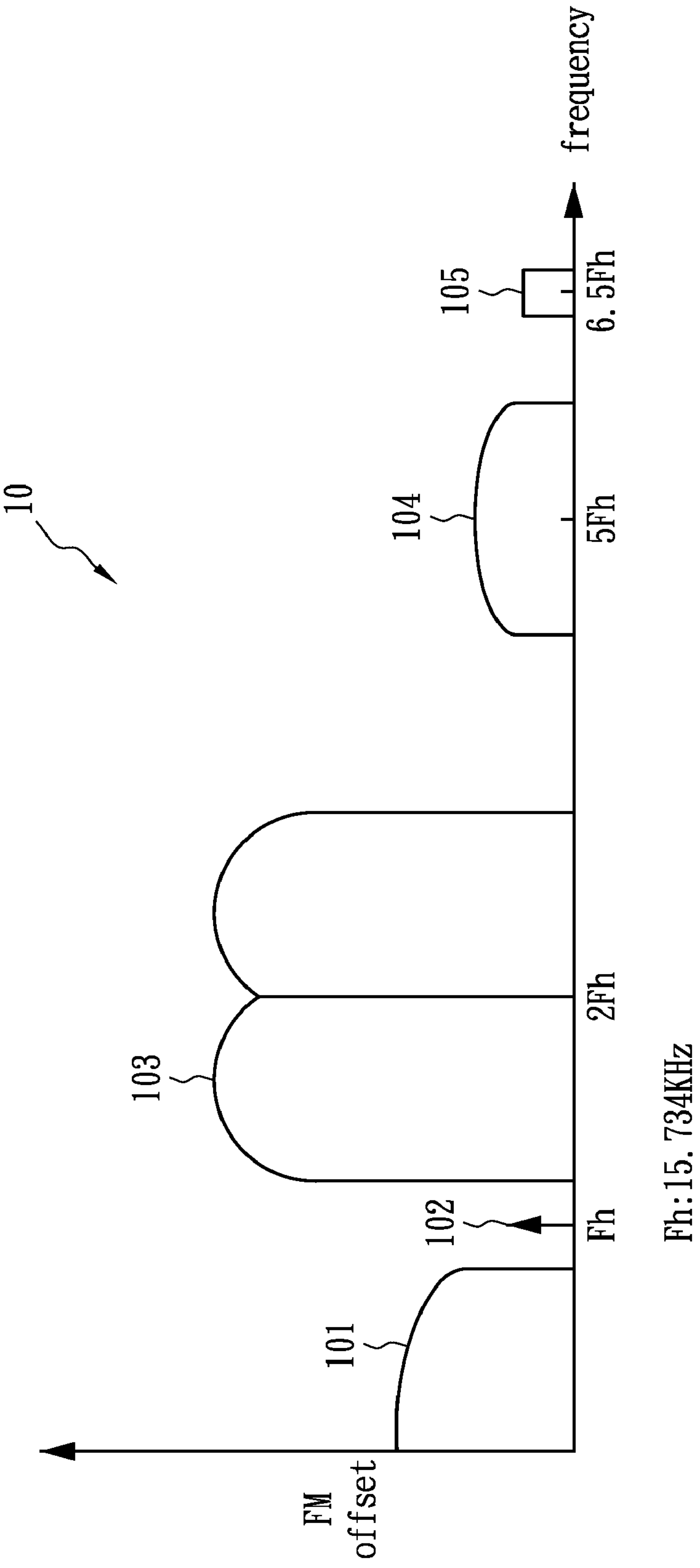
FIG. 1(a) (Prior Art)
FIG. 1(*a*) is a spectrum distribution diagram of a BTSC television multi-track stereo audio.
Figure 1B:
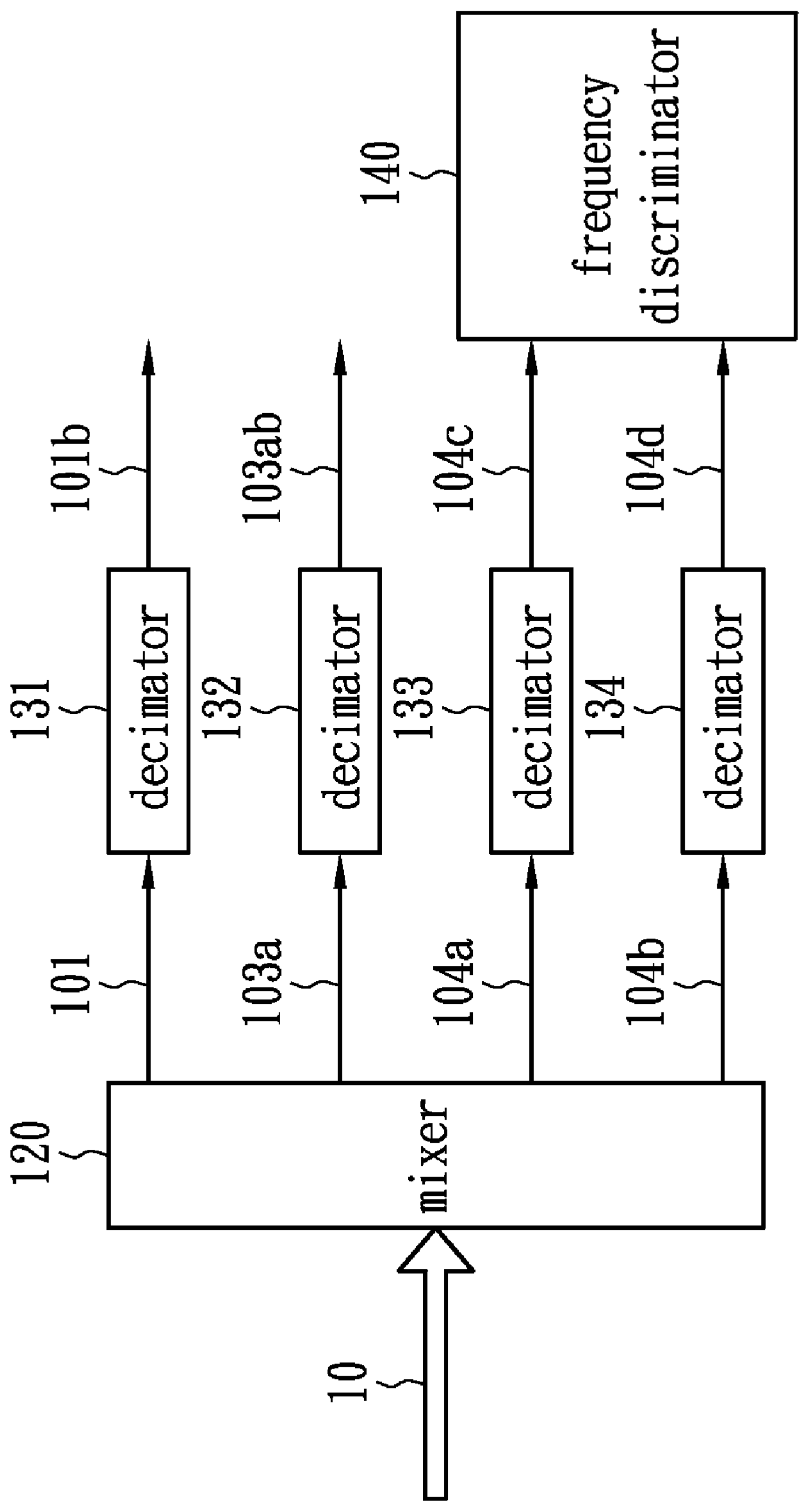
FIG. 1(b) (Prior Art)
Figure 1C:
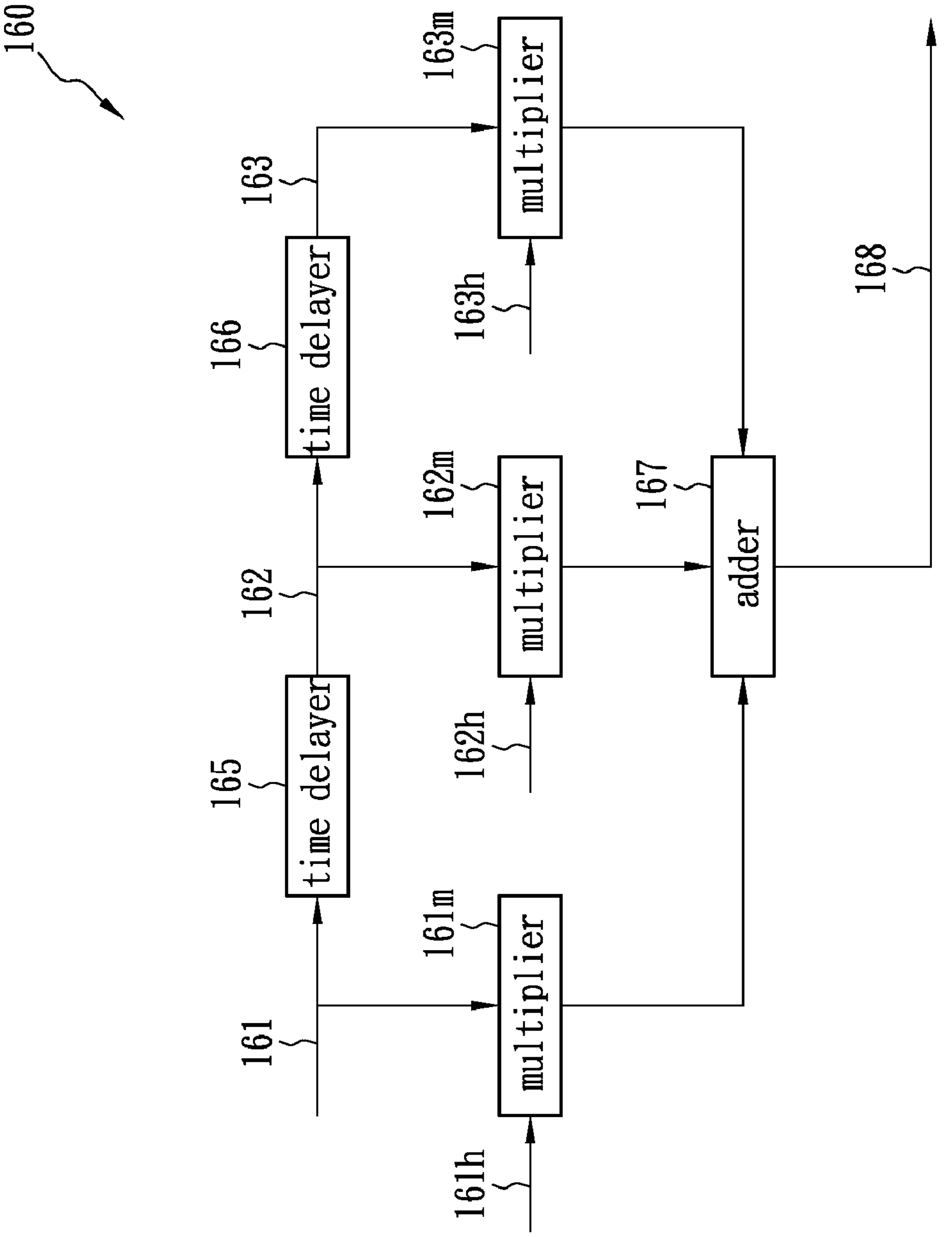
FIG. 1(c) (Prior Art)
Figure 1D:
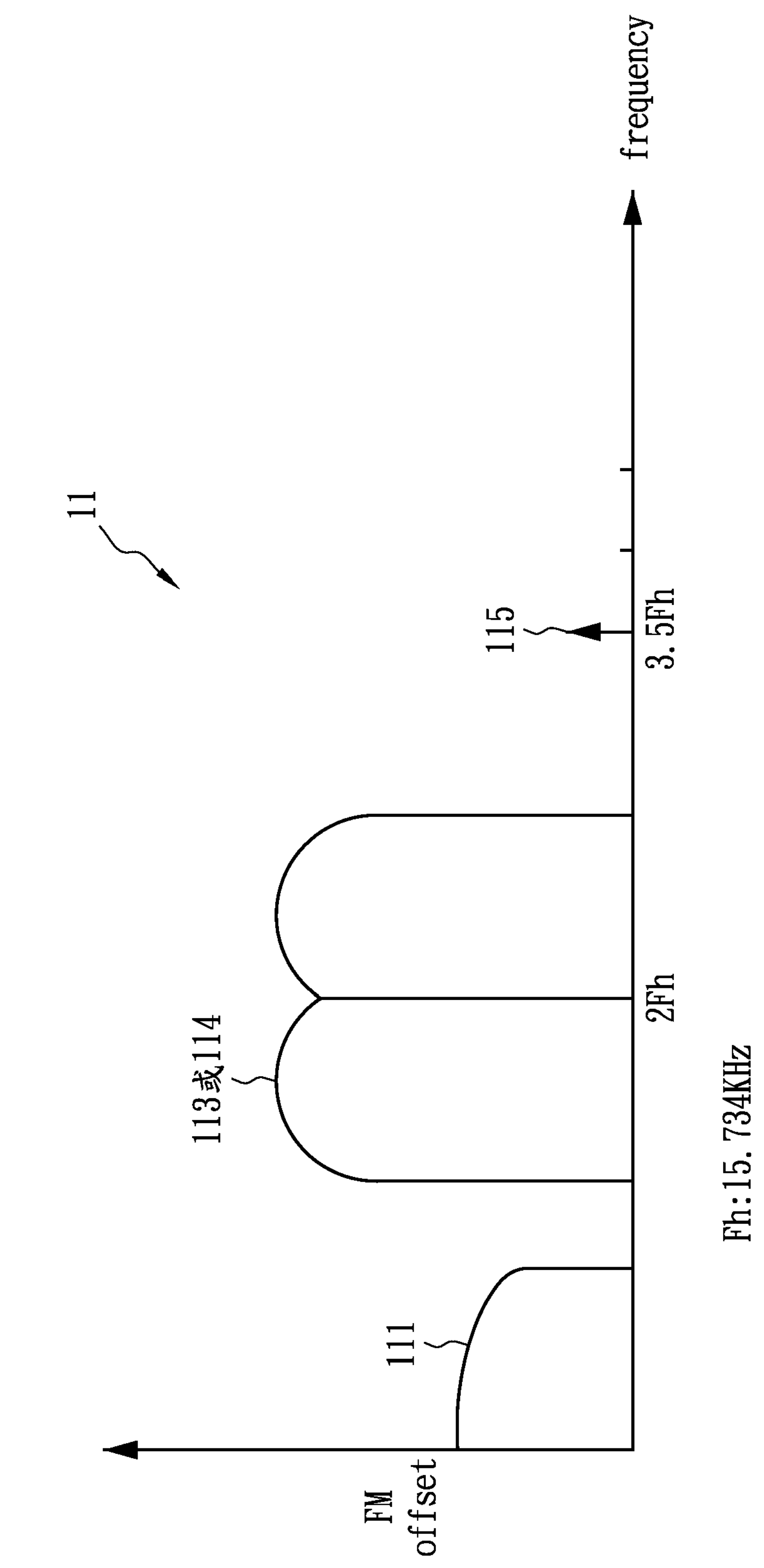
FIG. 1(d) (Prior Art)
Figure 1E:
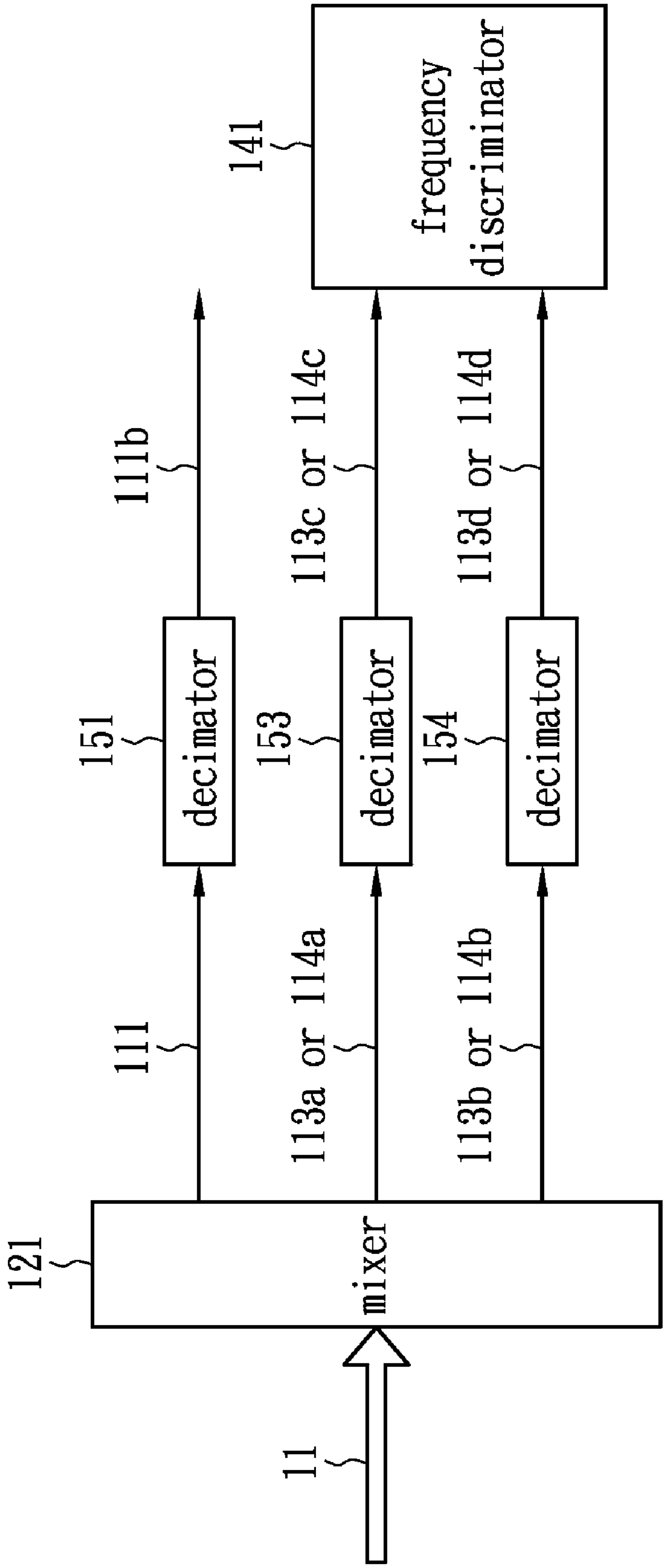
FIG. 1(e) (Prior Art)
Figure 2:
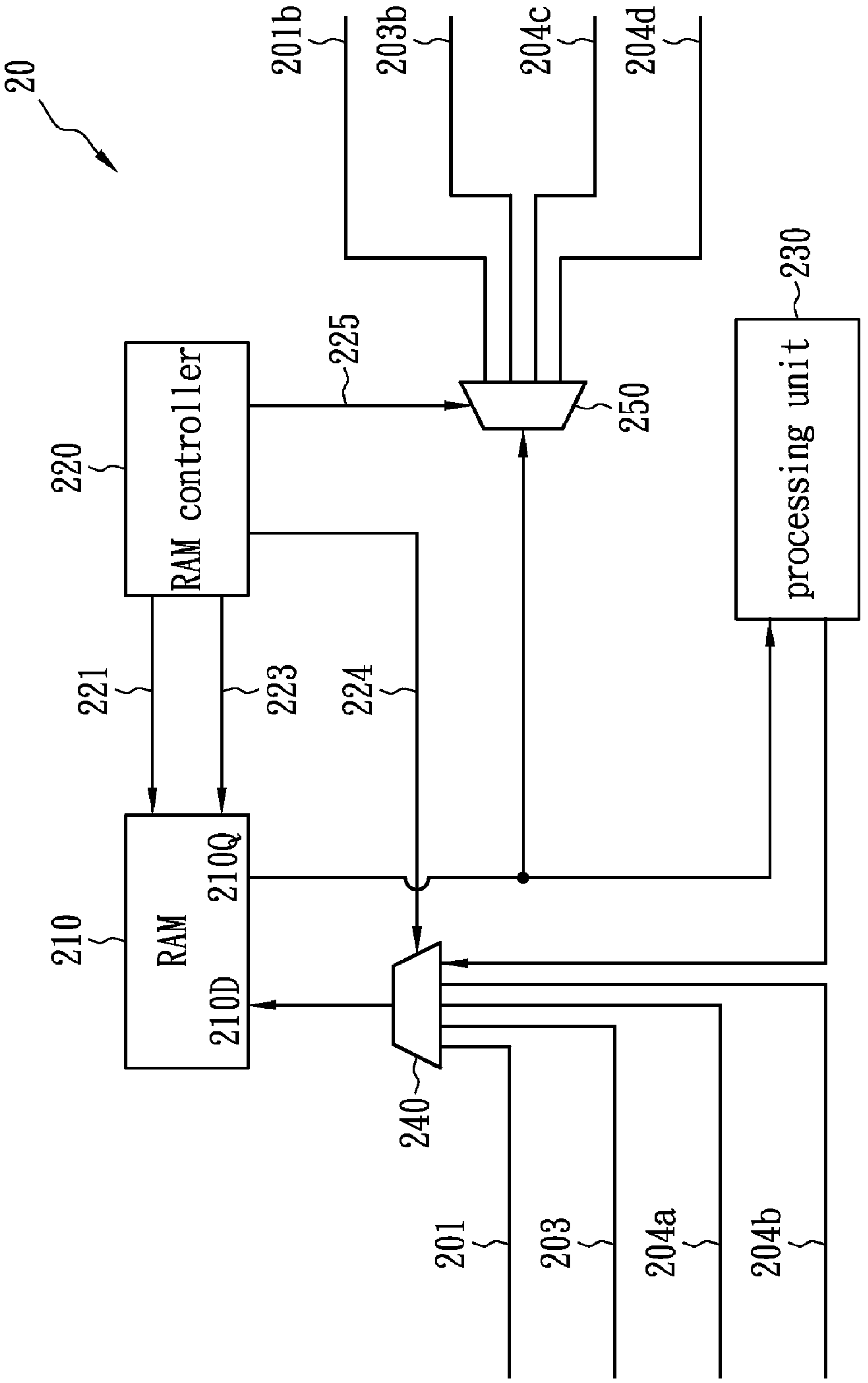
FIG. 2 is a schematic circuit diagram of a decimator according to a first embodiment of the present invention.

FIG. 2 is a schematic block diagram of a decimator 20 with a memory as a basic circuit according to a first embodiment of the present invention. As to input signals of the decimator 20, in addition to a single-track signal 201 originally being the base band signal, a stereo difference signal 203, a second audio program in-phase (SAP_I) signal 204*a* and a second audio program quadrature phase (SAP_Q) signal 204*b* are signals with the base band signals as the main part in the spectrum after being mixed and decimated by a frequency mixer. However, there is still some portion of the high-frequency signals derived from the mixing and decimating process.

Unlike the conventional art, the four input signals in the present invention are digital signals processed for decimation by a single decimator 20, instead of being processed by four decimators, as shown in FIG. 1(*b*).

The decimator 20 comprises a RAM 210, a RAM controller 220, a processing unit 230, a multiplex 240 and a demultiplex 250.

The RAM 210 is a single port memory having an input port 210D and an output port 210Q, and is used to store two kinds of data from different inputting paths. One of the inputting data types is the input data of the decimator 20 such as a single-track signal 201, a stereo difference signal 203, a second audio program quadrature phase (SAP_I) signal 204*a* or a second audio program quadrature phase (SAP_Q) signal 204*b*, and the other is processed data retrieved from the processing unit 230.

The RAM controller 220 is used to control the writing and reading of the data into or from the RAM 210 such that the RAM 210 finishes the digital signal processing for decimation together with the processing unit 230. The RAM controller 220 utilizes a read/write control signal 221 and an address bus signal 223 to determine into which a certain address of the RAM 210 the data entering the input port 210D is written, or to read the data from a certain address of the RAM 210 and then output the data via the output port 210Q.

In this embodiment, the RAM controller 220 regulates the control timing and repeatedly performs the time division on audios from four different paths, i.e., the single-track signal 201, the stereo difference signal 203, the second audio program in-phase (SAP_I) signal 204*a* and the second audio program quadrature phase (SAP_Q) signal 204*b*, inputted from the previous stage circuit according to the following steps of (a)-(c). Then, the audio after being decimated is outputted to the next stage circuit through time division, until all the input audios have been processed.

(a) First, the RAM controller 220 outputs a multiplex control signal 224 to control the multiplex 240, and outputs the read/write control signal 221 and the address bus signal 223 to the RAM 210, such that the audio input by the previous stage circuit may be written into the RAM 210.

(b) Next, the RAM controller 220 outputs the read/write control signal 221 and the address bus signal 223 to the RAM 210, and reads the individual audio stored in the RAM 210 for the processing unit 230 to perform the low pass filtering on the frequency domain and to perform the digital signal process for decimation on the time domain, thereby generating corresponding operational data, i.e., the audio signal data after being decimated, as mentioned above. The operational data are then written into the RAM 210 again.

(c) The RAM controller 220 reads the audio stored in the RAM 210 after being decimated, and outputs a demultiplex control signal 225 to control the demultiplex 250, such that the demultiplex 250 outputs the operational data such as the single-track signal 201*b*, the stereo difference signal 203*b*, the second audio program in-phase (SAP_I) signal 204*c* and the second audio program quadrature phase (SAP_Q) signal 204*d* to the next stage circuit through time division.

In view of the above, supposing the original sampling frequency of the four audios is 384 KHz, if the decimator 20 with 8 multiples is employed to reduce the sampling frequency, the sampling frequency of the four audios may be reduced to 48 KHz.

The digital signal process for the low-pass filtering performed by the processing unit 230 may be achieved by an FIR filter, and meanwhile the high-frequency signals derived from the decimating process may be filtered by the low-pass filtering process of the FIR filter. The time delayer of the FIR filter can be implemented as a memory cell of the RAM 210.

As for the decimator of the present invention with a memory as the basic structure, a single decimator may be used to replace the conventional four decimators. Upon being verified by the TSMC process of 0.18 μm, when the decimator circuit of the present invention is compared with the conventional decimator circuit, the decimator circuit of the present invention may reduce the areas by about 35%.

In addition, the time delayer of the decimator in the present invention may be implemented as a memory cell of the memory, and thus the problem of high-frequency transition of the logic level of the register does not occur when the FIR filter is operated, thereby effectively reducing power consumption.

Figure 3:
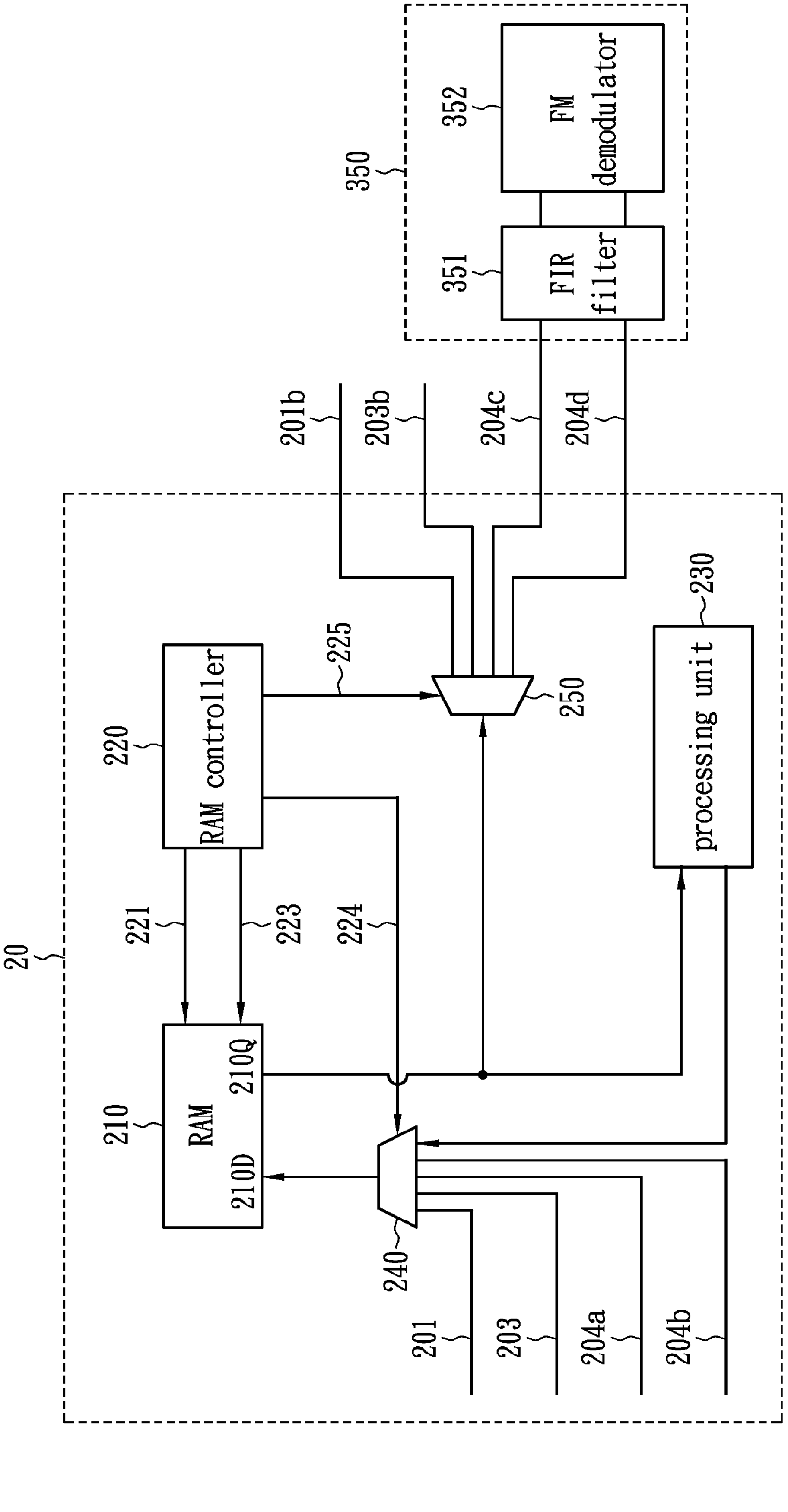
FIG. 3 is a schematic block diagram of a decimating system according to a second embodiment of the present invention.

FIG. 3 is a schematic block diagram of a decimating system according to a second embodiment of the present invention. The decimator 20 outputs the second audio program in-phase (SAP_I) signal 204*c* and the second audio program quadrature phase (SAP_Q) signal 204*d* to a frequency discriminator 350. The frequency discriminator 350 includes an FIR filter 351 and an FM demodulator 352, and the second audio program in-phase (SAP_I) signal 204*c* and the second audio program quadrature phase (SAP_Q) signal 204*d* are first low-pass filtered by the FIR filter 351 and sequentially FM demodulated by the FM demodulator 352. The time delayer of the FIR filter 351 in this embodiment may also be implemented as a memory cell of the RAM 210, thereby reducing the hardware space requirement.

Figure 4:
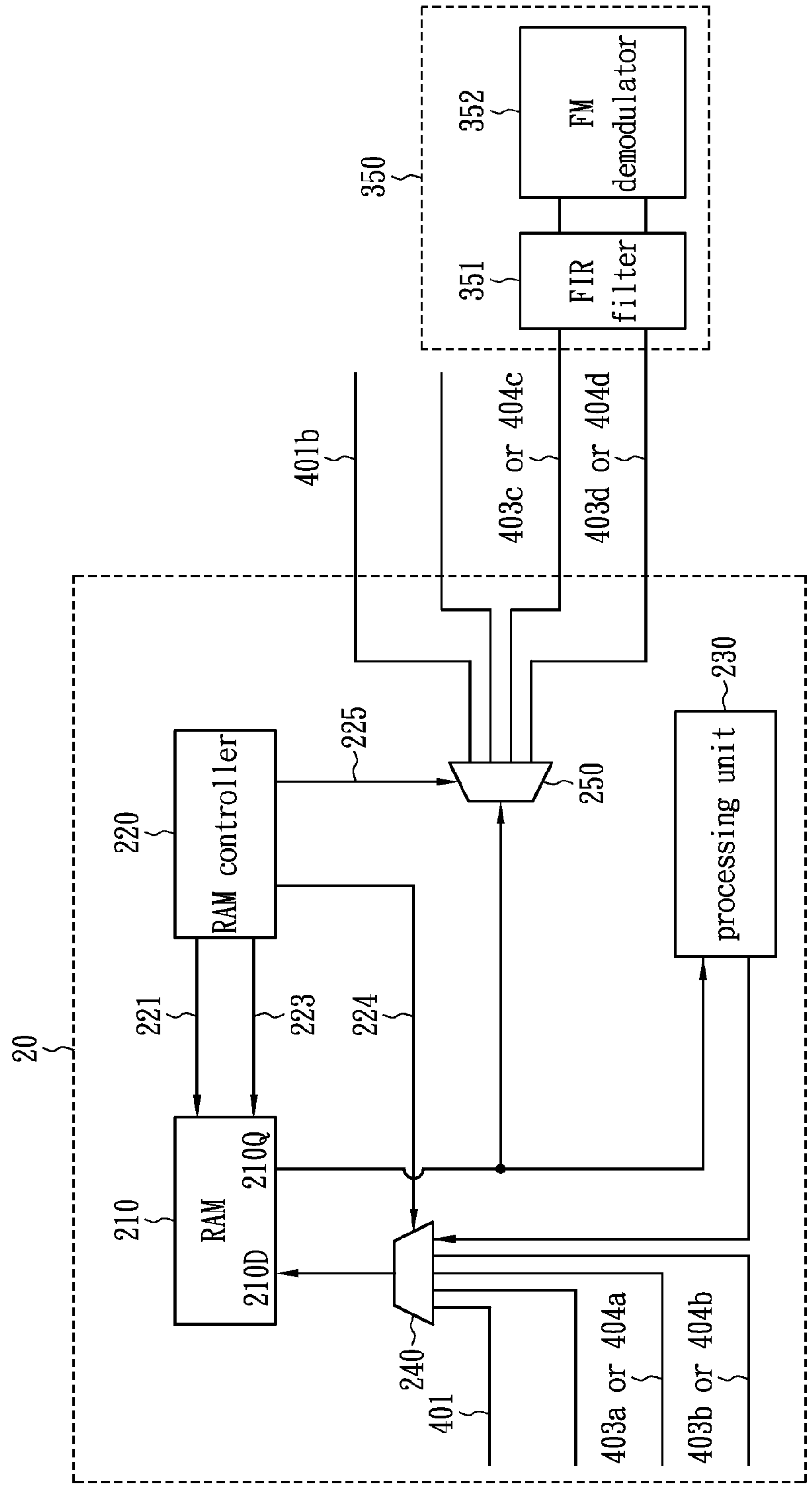
FIG. 4 is a schematic block diagram of a decimating system according to a third embodiment of the present invention.

FIG. 4 is a schematic block diagram of a decimating system according to a third embodiment of the present invention, which is different from the second embodiment in that there are only three input and output channels of the decimator 20 in this embodiment. As for the input signals of the decimator 20 in this embodiment, in addition to a single-track signal 401, a stereo difference in-phase (L−R_I) signal 403*a* and a second audio program in-phase (SAP_I) signal 404*a* share one input channel, a stereo difference quadrature phase (L−R_Q) signal 403*b* and a second audio program quadrature phase (SAP_Q) signal 404*b* share one input channel, and the stereo difference in-phase (L−R_I) signal 403*a* and the stereo difference quadrature phase (L−R_Q) signal 403*b* are separated and obtained by mixing and decimating the same stereo difference (L−R) signal. As for the output signals of the decimator 20 in this embodiment, in addition to a single-track signal 401*b*, a stereo difference in-phase (L−R_I) signal 403*c* and a second audio program in-phase (SAP_I) signal 404*c* share one output channel, while a stereo difference quadrature phase (L−R_Q) signal 403*d* and a second audio program quadrature phase (SAP_Q) signal 404*d* share one output channel. Compared with the single-track (L+R) signal 401*b*, the stereo difference in-phase (L−R_I) signal 403*c* and the stereo difference quadrature phase (L−R_Q) signal 403*d* need to be further demodulated by the frequency discriminator 350, and thus there is one more period of latency.

Supposing the time required for demodulating the stereo difference in-phase (L−R_I) signal 403*c* and the stereo difference quadrature phase (L−R_Q) signal 403*d* in this embodiment by the frequency discriminator 350 is 38.2 microseconds, the single-track monophonic (L+R) signal at the transmitting end should be transmitted later than the stereo difference (L−R) signal for about 20 microseconds according to the EIA-J regulation as mentioned above, and there is a time difference with a predetermined value of 20 microseconds between the single-track signal (L+R) and the stereo difference (L−R) signal when they are received at the receiving end. Therefore, an additional latency of 18.2 microseconds must be added between the input single-track signal 401 and the output single-track signal 401*b* of the decimator 20, so as to accurately separate a left single-track signal from a right single-track signal.

Supposing the sampling frequency of the single-track signal 401 is 384 KHz, the single-track signal 401 may be delayed for 7 sampling units during the decimating process, and thus the resulting latency is 7/384000 seconds, i.e., 18.2 microseconds.

The above-described embodiments of the present invention are intended to be illustrative only. Numerous alternative embodiments may be devised by persons skilled in the art without departing from the scope of the following claims.

What is claimed is:

1. A decimator for a multi-channel audio, comprising:

a processing unit for decimating each audio component of an inputted multi-channel audio and generating multi-channel operational data;

a memory coupled to the processing unit for storing each audio component of the multi-channel audio and the multi-channel operational data;

a controller coupled to the memory for controlling the multi-channel audio and the multi-channel operational data to be written to and read from the memory, and for processing the input of the multi-channel audio and the output of the multi-channel operational data through time division; and a demultiplex connected to an output port of the memory for selecting the multi-channel operational data read from the memory.

2. The decimator of claim 1, wherein the memory is a random access memory (RAM).

3. The decimator of claim 1, wherein the controller outputs a read/write control signal to the memory to indicate whether the multi-channel audio is written or the multi-channel operational data are read by the memory.

4. The decimator of claim 3, wherein the controller outputs an address bus signal to the memory so as to determine the writing or reading address of the memory.

5. The decimator of claim 1, further comprising a multiplex connected to an input port of the memory for selecting one of the audio components of the multi-channel audio written into the memory.

6. The decimator of claim 5, wherein the controller outputs a multiplex control signal to the multiplex for controlling the multiplex to select one of the audio components of the multi-channel audio.

7. The decimator of claim 1, wherein the controller outputs a demultiplex control signal to the demultiplex for controlling the demultiplex to select the multi-channel operational data.

8. The decimator of claim 1, wherein the controller controls and performs the steps of:

writing each audio component of the inputted multi-channel audio into the memory through time division;

reading each audio component of the multi-channel audio to the processing unit;

decimating and generating multi-channel operational data from the processing unit;

writing the multi-channel operational data into the memory; and reading and outputting the multi-channel operational data through time division.

9. The decimator of claim 1, wherein the inputted multi-channel audio is a television multi-track stereo audio (MTS).

10. The decimator of claim 9, wherein the television multi-track stereo audio comprises a single-track signal, a stereo difference signal, a second audio program in-phase (SAP_I) signal, and a second audio program quadrature phase (SAP_Q) signal.

11. The decimator of claim 9, wherein the television multi-track stereo audio comprises signals with baseband signals as a main portion after being mixed and decimated.

12. A decimating method for a multi-channel audio, comprising:

writing each audio component of a multi-channel audio into a memory;

reading each audio component of the multi-channel audio;

performing decimation to generate corresponding multi-channel operational data;

writing the multi-channel operational data into the memory; and reading and outputting the multi-channel operational data by a demultiplexer connected to an output port of the memory.

13. The decimating method of claim 12, wherein the multi-channel audio is inputted into the memory through time division.

14. The decimating method of claim 12, wherein the multi-channel operational data are outputted through time division.

15. The decimating method of claim 12, wherein the multi-channel audio is a television multi-track stereo (MTS) audio comprising a single-track signal, a stereo difference signal, a second audio program in-phase (SAP_I) signal, and a second audio program quadrature phase (SAP_Q) signal.

* * * * *